(12) United States Patent
Krichi et al.

(10) Patent No.: US 8,162,222 B2
(45) Date of Patent: Apr. 24, 2012

(54) SYSTEM AND METHOD FOR IDENTIFYING ERASURES IN A 2D SYMBOL

(75) Inventors: Mostafa Krichi, Castelnau-d'estretefonds (FR); Patrice Thebault, Lapeyrouse-Fossat (FR)

(73) Assignee: Intermec IP Corp., Everett, WA (US)

( * ) Notice: Subject to any disclaimer, the term of this patent is extended or adjusted under 35 U.S.C. 154(b) by 480 days.

(21) Appl. No.: 12/359,178

(22) Filed: Jan. 23, 2009

(65) Prior Publication Data

US 2009/0212111 A1    Aug. 27, 2009

Related U.S. Application Data

(60) Provisional application No. 61/023,640, filed on Jan. 25, 2008.

(51) Int. Cl.
*G06K 7/10* (2006.01)
*G06K 19/06* (2006.01)

(52) U.S. Cl. .................. 235/462.11; 235/494

(58) Field of Classification Search ............ 235/462.01, 235/462.07, 462.1, 462.11, 462.25, 472.01–472.03
See application file for complete search history.

(56) References Cited

U.S. PATENT DOCUMENTS

| 5,553,084 A | 9/1996 | Ackley et al. |
| 5,591,956 A | 1/1997 | Longacre, Jr. et al. |
| 6,064,763 A | 5/2000 | Maltsev |
| 6,102,295 A | 8/2000 | Ogami |
| 6,685,095 B2 | 2/2004 | Roustaei et al. |
| 7,028,911 B2 * | 4/2006 | Cheung et al. ................ 235/494 |
| 7,287,696 B2 * | 10/2007 | Attia et al. ................ 235/462.01 |
| 2006/0043189 A1 * | 3/2006 | Agrawal et al. .......... 235/462.08 |
| 2007/0188781 A1 * | 8/2007 | Uzawa et al. ................ 358/1.9 |
| 2007/0228171 A1 * | 10/2007 | Thiyagarajah ........... 235/462.09 |

OTHER PUBLICATIONS

International Organization for Standardization, "ISO/IEC 18004:2006 Information Technology—Automatic identification and data capture techniques—QR Code 2005 bar code symbology specification," http://www.iso.org/iso/ose_catalogue_tc/catalogue_detail.htm?csnumber=43655, accessed Apr. 30, 2009.

* cited by examiner

*Primary Examiner* — Michael G Lee
*Assistant Examiner* — Suezu Ellis
(74) *Attorney, Agent, or Firm* — Perkins Coie LLP

(57) ABSTRACT

One embodiment of a method for identifying a codeword as an erasure in a Quick Response code (QR code) captured by a bar code reader includes, identifying the scrambling mask used for encoding the data in the QR code. A location of the codeword in the QR code corresponds with a portion of the scrambling mask. The codeword comprises multiple codeword bits and the portion of the scrambling mask comprises multiple mask bits. The method further includes, generating an unscrambled codeword by performing a logical operation between each of the multiple codeword bits and each of the multiple mask bits, generating a reference matrix by applying the scrambling mask to a uniform matrix, and/or comparing the unscrambled codeword with the reference matrix to determine whether the codeword is the erasure.

17 Claims, 15 Drawing Sheets

Hexadecimal Comparison

Bit-By-Bit Comparison

Reference Matrix

Unmasked 2D Symbol

US 8,162,222 B2

SYSTEM AND METHOD FOR IDENTIFYING ERASURES IN A 2D SYMBOL

CLAIM OF PRIORITY

This application claims priority to U.S. Provisional Patent Application No. 61/023,640 entitled "System and Method of Identifying Erasures in a 2D Machine-Readable Symbol", which was filed on Jan. 25, 2008, the contents of which are expressly incorporated by reference herein.

BACKGROUND

Erasures typically refer to error codewords in a symbol (e.g., 2D symbol, 2D machine-readable symbol, 2D barcode, 1D barcode, data matrix, etc.). Therefore, an identified erasure is typically characterized as having incorrect patterns at known locations. In some instances, when a symbol is partially out of the field of view of a symbol reader, and/or has pixel images where most if not all of the characters are black or white, erasure correction can be applied to the error codewords to facilitate in the decoding of encoded data in symbols. In particular, the scanning performance of a symbol reader (e.g., 2D machine-readable symbol reader, machine-readable symbol reader, laser scanner, bar code reader, etc.) can be improved, in the event that the symbol is damaged, is partially outside of the field of view of the machine-readable symbol reader, and/or otherwise partially un-readable.

In some instances, error codewords are detected in symbols where a substantial portion of the pixels are black or white. In particular, for QR codes (Quick Response codes), the errors can typically be detected in encoded codewords as mostly, if not all, black or white. However, after codewords have been unmasked (e.g., by one of the eight masks shown in FIG. 7), the error codewords in a QR code that were originally identifiable via detecting substantial black portions or substantial white portions are now unmasked. The white/black cells that were encoded now have a pattern (e.g., value/sequence) that is dependent on, for example, the mask applied, the mask value at the particular location of the white/black portions, and the codeword locations.

DETAILED DESCRIPTION

Figure 1A:
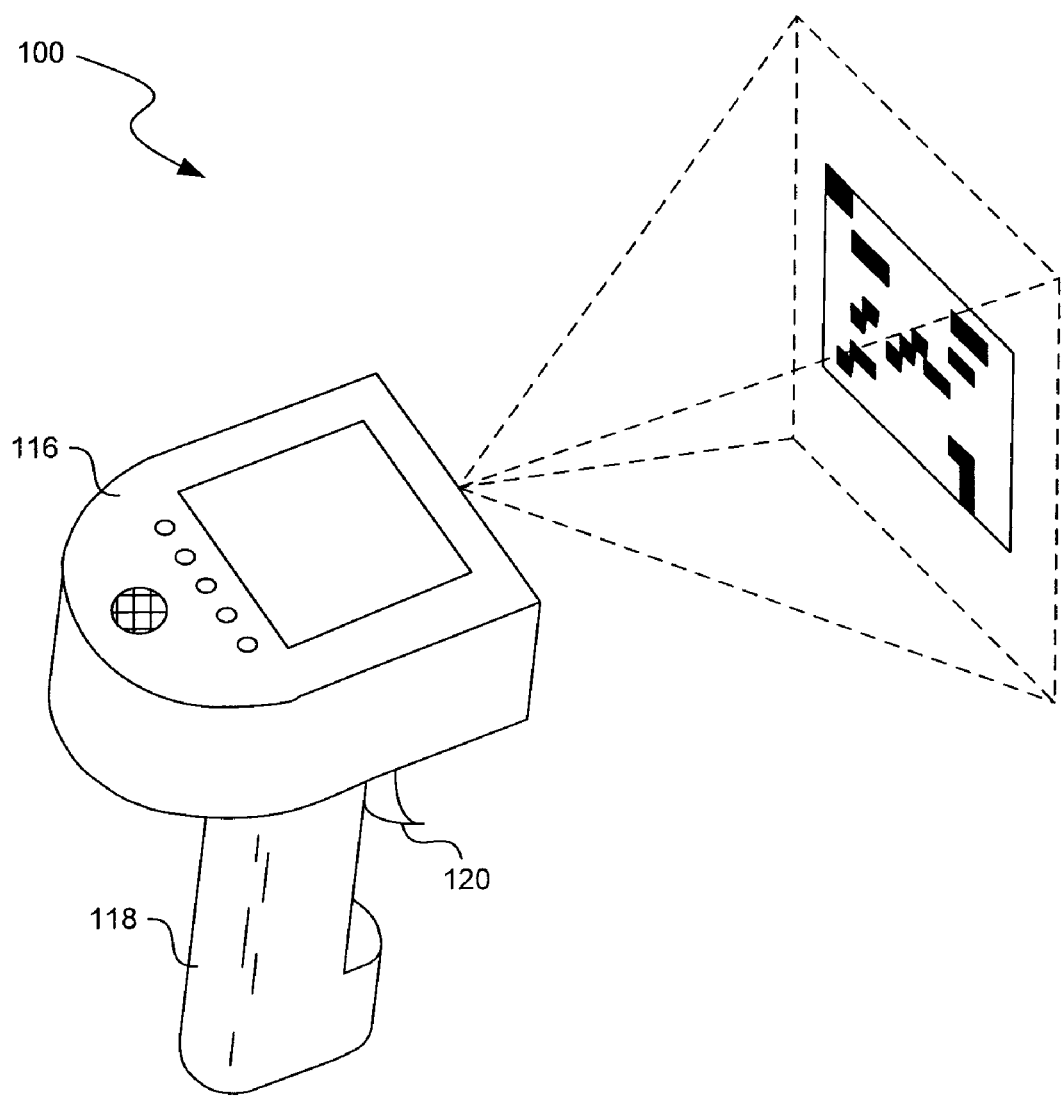
FIG. 1A illustrates an example of a symbol reader.

The following description and drawings are illustrative and are not to be construed as limiting. Numerous specific details are described to provide a thorough understanding of the disclosure. However, in certain instances, well-known or conventional details are not described in order to avoid obscuring the description.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, and no special significance should be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

The terminology used in the description presented below is intended to be interpreted in its broadest reasonable manner, even though it is being used in conjunction with a detailed description of certain specific examples of the disclosure. Certain terms may even be emphasized below; however, any terminology intended to be interpreted in any restricted manner will be overtly and specifically defined as such in this Detailed Description section.

Embodiments of the present disclosure include systems and methods of identifying erasures in a 2D symbol. The techniques involved in error detection and correction can be broadly applied to digital imaging where an encoding process (e.g., masking process) involving binary values. Yet other symbol detection related applications are contemplated and do not deviate from the novel art of this disclosure.

One or more embodiments can be utilized to identify a codeword as an erasure in a symbol (2D symbol) that has been encoded, masked (e.g., one or more of the eight masks in the QR code encoding process illustrated with further reference to FIG. 2), or otherwise scrambled. In one embodiment, erasures are identified in codewords by comparing the unmasked codewords (e.g., codewords or matrices in a 2D symbol such as bar code or QR code) with a reference matrix. The reference matrix is, in one embodiment, obtained via applying the same mask used in masking the codeword to a uniform matrix (a matrix with same-valued bits).

Figure 3:
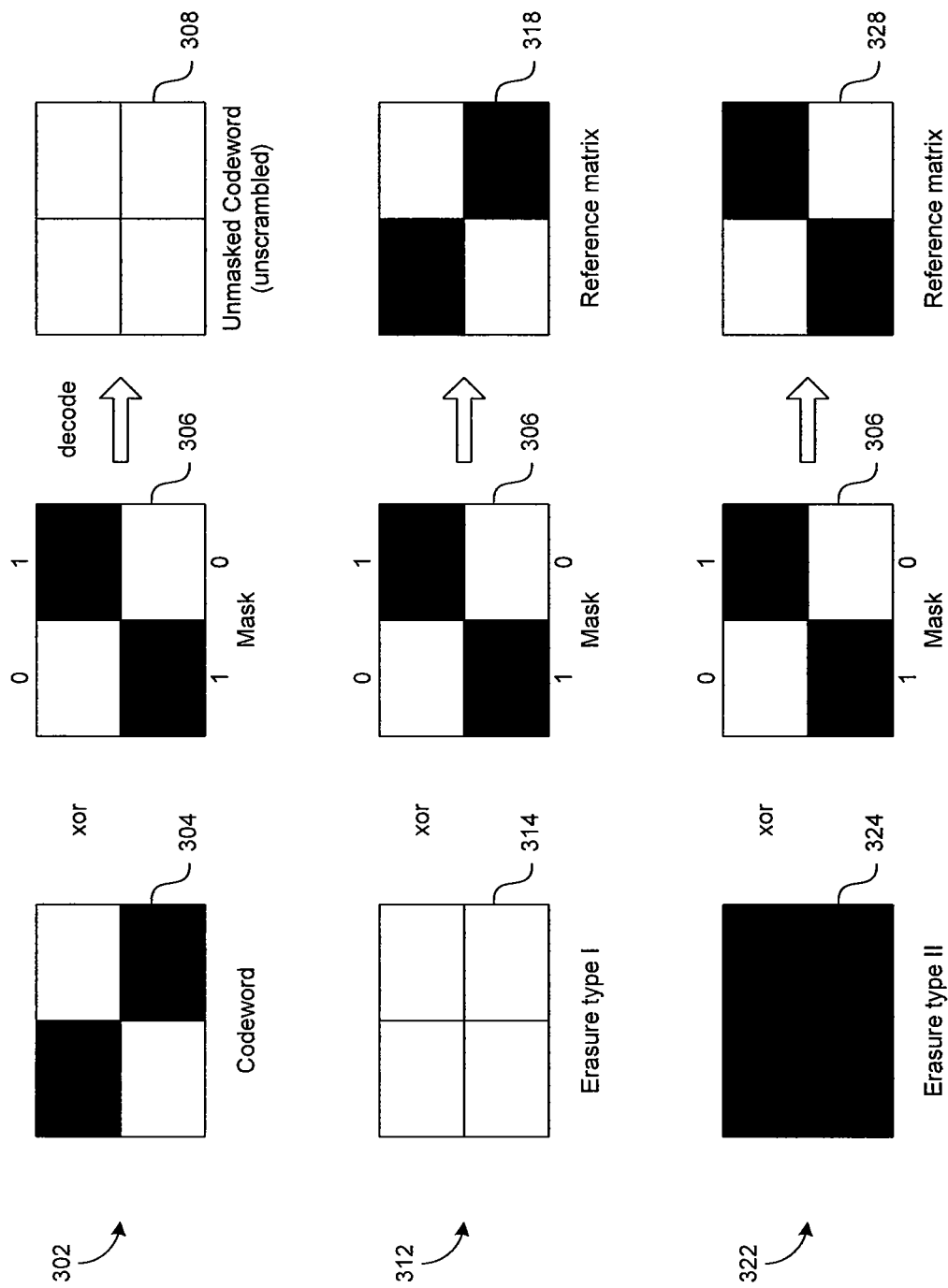
FIG. 3 depicts example diagrams illustrating 2D symbols obtained from applying a mask to a codeword and uniform matrices, respectively.

As illustrated with further reference to FIG. 3, if the unmasked (unscrambled) codeword has the same pattern (e.g., same locations of bit '0' and bit '1') as the reference matrix, the codeword can be identified as having an erasure where it has the same pattern as the reference matrix. Similarly, if the unmasked codeword has the opposite pattern (e.g., opposite locations of bit '0' and bit '1') as the reference matrix, the codeword can also be identified as having an erasure.

Imaging Devices

FIG. 1A illustrates an example of a symbol reader 100.

The symbol reader 100 is, in one embodiment, provided for identifying, capturing, decoding, and/or reading one or more targets (e.g., a symbol (1D or 2D), other machine-readable symbols, a pixel reader, a target region, a signature field, a target object, etc.) in a target object or image.

The symbol reader 100 (e.g., 2D symbol reader, a machine-readable symbol reader) includes a head 116, a handle 118, and an actuator such as a trigger 120. While the trigger 120 is shown with a specific shape and in a specific location in the embodiment of FIG. 1A, other embodiments may employ different arrangements. For example, the trigger 120 can be embodied as a side-mounted finger trigger, top-mounted thumb trigger, button or key, touch screen, and other trigger arrangements. One embodiment further provides a proximity trigger, which uses optics, acoustics, or other mechanisms to determine proximity of an object to automatically activate without requiring a user to pull the trigger.

The symbol reader 100 can include a portable machine-readable symbol reader, a hand-held imaging device type device, a portable phone, a camera, a camera phone, and/or other suitable electronic device having the data reading capabilities described herein. Further, the symbol reader 100 can be any scanner such as a laser scanner but more likely comprising an image sensor including but not limited to a CCD sensor, a CMOS sensor, and/or a photodiode. It is appreciated that some embodiments are provided that may not necessarily have the same shape or identical features or identical use as the embodiments illustrated in the various figures.

In one embodiment, the reader may use one or more light sources suitably arranged to generate a desired size and shape of an illumination pattern. Examples of such light sources include laser light sources, light emitting diodes (LEDs), or other types of light sources that generate light that is visible to the user and that can be detected by a sensor. Ambient light may be used instead of, or to supplement, the illumination pattern for such image acquisition embodiments.

The techniques for imaging a target (e.g., an image, a target region, a bar code, a symbol (1D/2D machine-readable symbol), etc.) and identifying erasures in a symbol are further described with reference to FIG. 3-5.

Figure 1B:
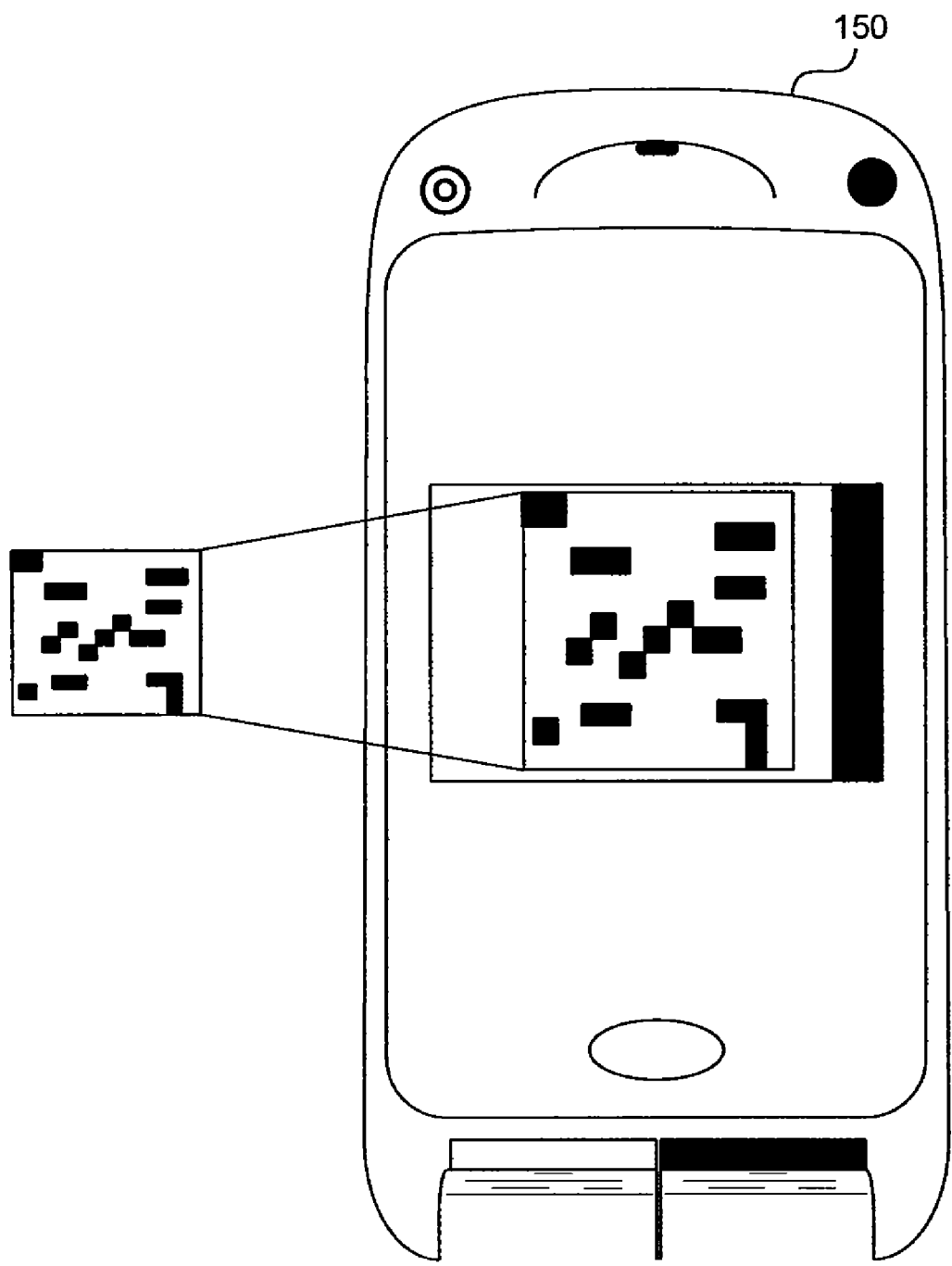
FIG. 1B illustrates an example of a portable phone or other portable device (such as a PDA, a smart phone, a Blackberry, and/or a palmtop computer) with symbol reading capabilities.

FIG. 1B illustrates an example of a portable phone 150 or other portable device (such as a PDA, a smartphone, a Blackberry, and/or a palmtop computer) with symbol reading capabilities, according to one embodiment.

The example portable phone 150 of FIG. 1B has data or symbol reading capabilities, for example, the target (e.g., an image, a target region, a machine-readable symbol, a bar code, a data matrix, a QR code, etc.) reading functions described in association with the symbol reader of FIG. 1A, including but not limited to erasure identification in a 2D symbol. As shown, the portable phone includes an imaging portion (e.g., image sensor, an imaging unit, scanner, and/or camera) to scan a target (e.g., an image, a target region, a target object, a 2D symbol, etc.). The target region or object can then be detected and otherwise further analyzed or decoded to locate the data and/or to retrieve the contents of the encoded data, as noted herein.

Figure 2A:
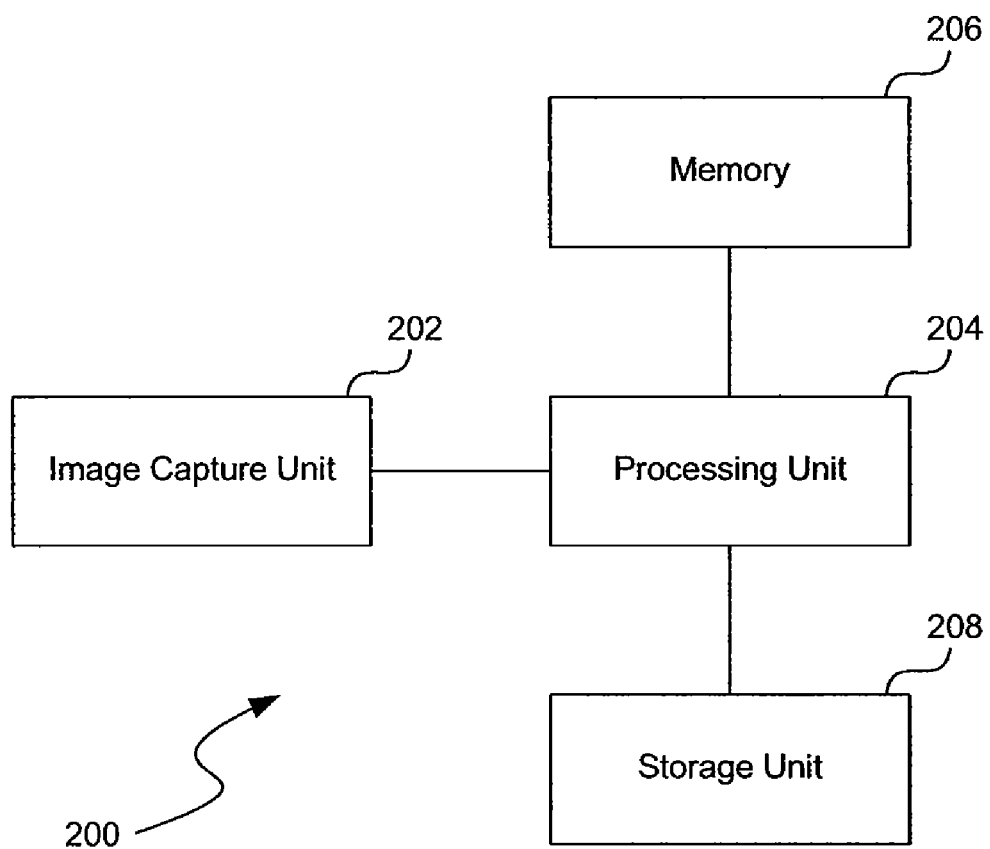
FIG. 2A is a functional block diagram of a symbol reader.

FIG. 2A is a functional block diagram of a symbol reader 200.

A target (e.g., an image, a target region, a signature field, a symbol, a machine-readable symbol, 2D barcodes, data matrices, QR codes, and/or the like codes, etc.) can be read using the symbol reader 200 by way of example but not limitation, a barcode reader. In one embodiment, the symbol reader 200 includes an image capture unit 202, a processing unit 204, a memory unit 206, and/or a storage unit 208. Additional or less units or modules may be included. The symbol reader 202 can be any combination of hardware components and/or software agents for capturing, reading, retrieving, processing, and/or storing a symbol.

For example, the image capture unit 202 can include an electro-optical device such as a laser scanner, rasterizing laser, wand-based optical transducer one- or two-dimensional CCD, semiconductor array, vidicon, or other area imaging device (e.g., 1D imaging device, 2D imaging device) capable of converting received light into electrical signals. The electro-optical device in the image capture unit 202 can also include a light source such as an LED, flash bulb, infrared light source, or other light-emitting element. As used generally herein, the term "reader" refers to any device capable of converting modulated light received from a target into electrical signals. Any convenient and/or known reader may be suitable for use in the present disclosure.

One embodiment of the symbol reader 200 further includes a processing unit 204. The data read from the image capture unit 202 can be inputted to a processing unit 204. The processing unit 204 can include one or more processors, CPUs, microcontrollers, FPGAs, ASICs, DSPs, or any combination of the above. Data that is input to the symbol reader 200 can be processed by the processing unit 204 and output to display and/or output via a wired or wireless connection to an external computer, such as a host or server computer by way of a communications component.

One embodiment of the symbol reader 200 further includes a memory unit 206 and a storage unit 208. The memory unit 206 and a storage unit 208 are, in some embodiments, coupled to the processing unit 204. The memory unit can include volatile and/or non-volatile memory.

In decoding the digital image data, the processing unit 204 may perform one or more error detection and/or correction processes. For example, the processing unit 204 may identify a codeword as an erasure in a 2D symbol. In one embodiment, the processing unit 204 generates a reference matrix to be compared with an unmasked codeword such that erasures can be detected.

In particular, to identify a codeword as an erasure or as having an erasure in a 2D symbol (e.g., QR code or 2D bar code), the reference matrix is generated by applying a mask to a uniform matrix having same-valued bits (black or white matrix) of value '1' or value '0'. The mask to be applied is, in some embodiments, determined based on the mask applied to the 2D symbol. In one embodiment, the processing unit 204 identifies the mask used for encoding the data in the 2D symbol.

For example, the formatting information of a QR code can be identified using predetermined portions of the QR code. In most instances, information regarding error correction level and/or mask pattern can be identified from the formatting information. In QR codes, the format information bits generally include 5 data bits. The first two bits contain information regarding the error correction level and the third to fifth bits contain information regarding the mask code applied to the symbol. These bits are generally twice mapped into reserved areas. More details on the QR Code may be found at ISO/IEC 18004:2006 Information technology—Automatic identification and data capture techniques—QR Code 2005 bar code symbology specification, available at, e.g., http://www.iso.org/iso/iso_catalogue/catalogue_tc/catalogue_detail.htm?csnumber=436 55, which is incorporated by reference herein.

In some instances, the processing unit 204 further compares the codeword in question with one or more of the reference matrices. The processing unit 204 can identify the codeword as an erasure or as having an erasure when the codeword or portions of the codeword has the same or inverse bit values as the reference bits in the reference matrices.

Figure 2B:
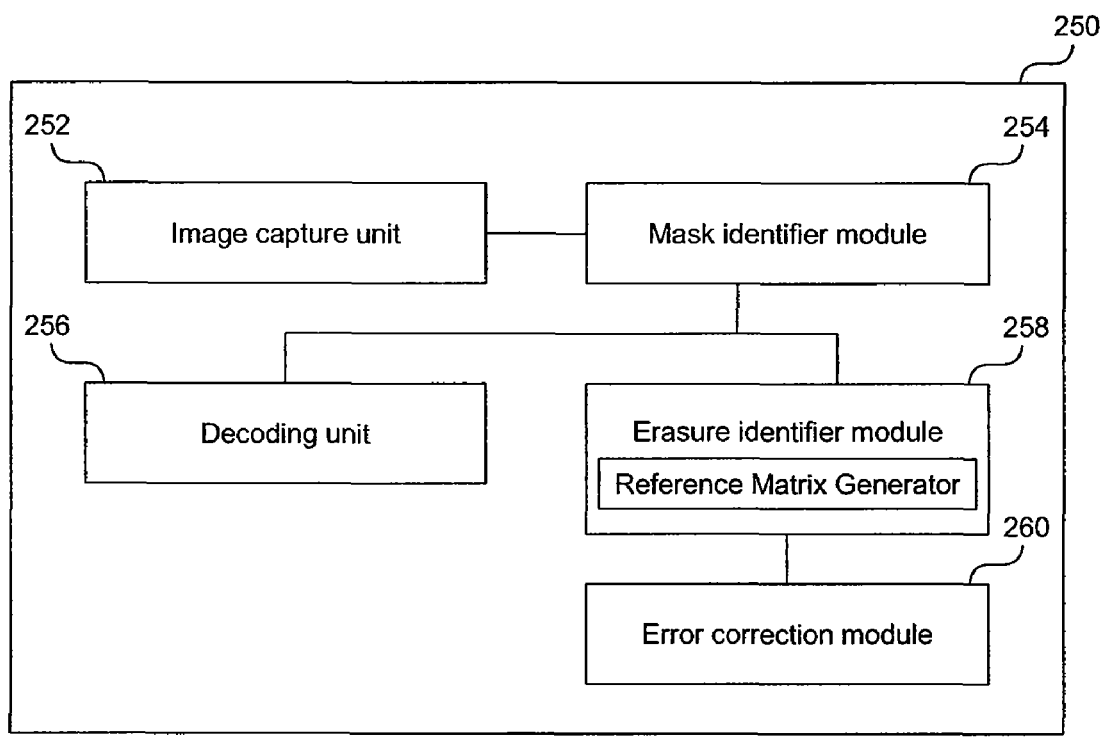
FIG. 2B is an example block diagram of an apparatus for identifying a codeword in a 2D symbol as an erasure or as having an erasure.

In some embodiments, any portion of or all of the functions described herein of the erasure detection functionality of the processing unit 204 can be performed in one or more of, or a combination of software and/or hardware modules external or internal to the processing unit, in any known or convenient manner, as illustrated with further reference to FIG. 2B. In particular, with reference to the example symbol reader 200 illustrated in FIG. 2A, the erasure detection, reference matrix generation, and bit-comparison functions can be performed via any of the combinations of modules in the control subsystem that are not illustrated, including, but not limited to, the processing unit 204 and/or the memory unit 206.

FIG. 2B is an example block diagram of an apparatus 250 for identifying a codeword in a 2D symbol as an erasure or as having an erasure.

In the example of FIG. 2B, the apparatus 250 includes an image capture unit 252, a mask identifier module 254, a decoding unit 256, an erasure identifier module 258, and/or an error correction module 260. One embodiment of the erasure identifier module 258 includes a reference matrix generator. Additional or less modules may be included. The apparatus 250 may be communicatively coupled to the image capture unit 252.

One embodiment of the apparatus 250 includes the image capture unit 252. The image capture unit 252 may be partially or wholly internal to the apparatus 250. The image capture unit 252 can be any combination of hardware components and/or software agents able to detect, capture, save, modify, and/or discard an image. The image capture unit 252 is the same or similar in function to the image capture unit 202 of FIG. 2A.

One embodiment of the apparatus 250 further includes the mask identifier module 254. The mask identifier module 254 can be any combination of hardware components and/or software agents able to identify the mask used for encoding the data in the codeword of a 2D symbol.

Figure 7:
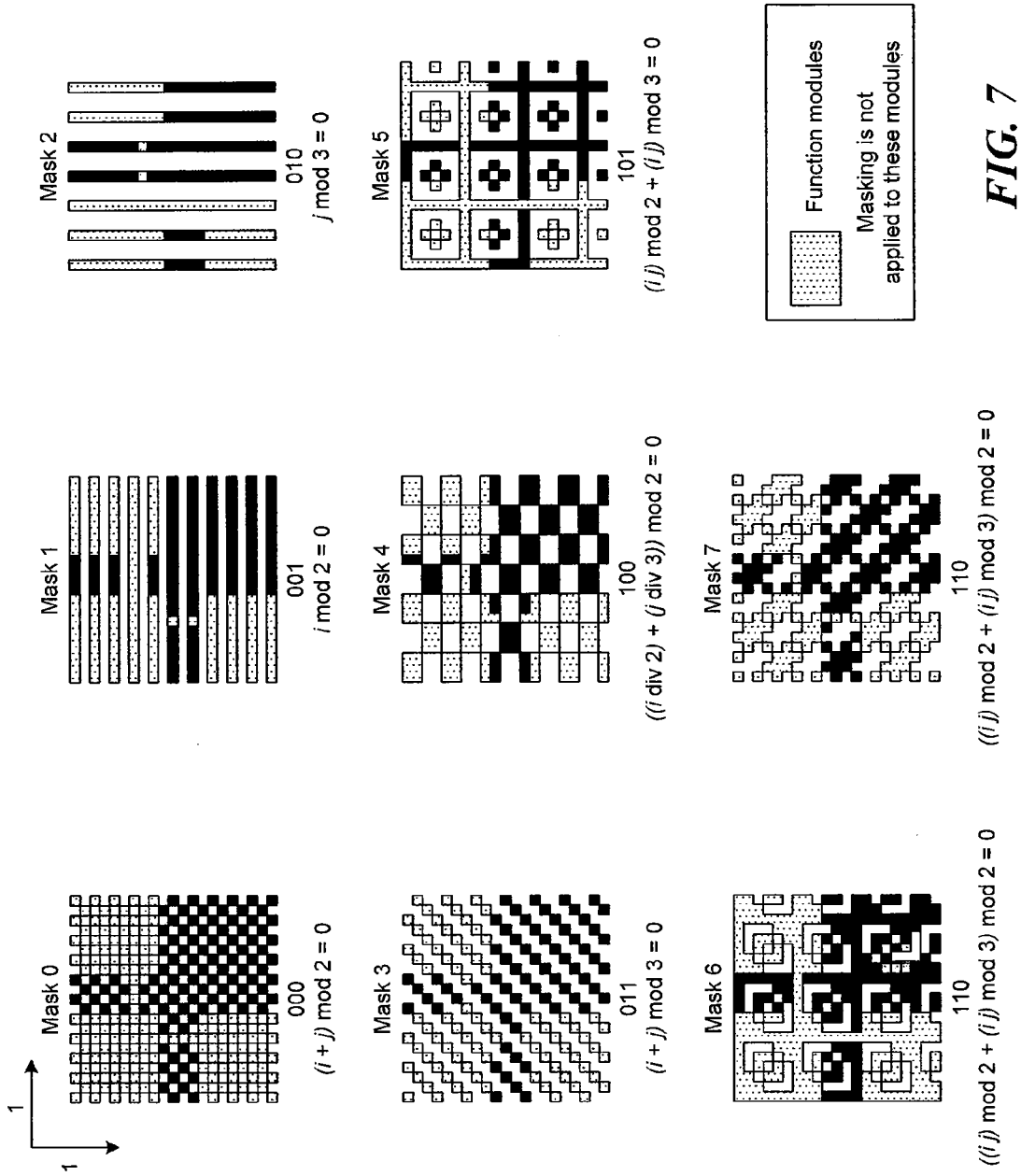
FIG. 7 depicts the mask patterns for encoding data in a QR code.

The mask identifier module 254 is coupled to the image capture unit 252 and is able to receive images captured by the image capture unit 252 having 2D symbols. These 2D symbols are typically encoded or otherwise scrambled, for example, by a mask for QR coding. The types of masks that can be used in QR coding are illustrated in FIG. 7. In a QR code, the mask identifier module 254 can identify the mask by retrieving bit values from the 2D symbol from specific locations having the formatting information for the QR code. The mask identified is the original mask used for encoding the data in the 2D symbol. This mask can thus subsequently be used to unmask the data, in one embodiment, for the purposes of detecting erasures in a codeword in the 2D symbol such as a QR code captured by the image capture unit 252.

One embodiment of the apparatus 250 further includes the decoding unit 256. The decoding unit 256 can be any combination of hardware components and/or software agents able to decode, unmask, and/or otherwise unscramble data encoded in a 2D symbol or a codeword in a 2D symbol.

The decoding unit 256 is coupled to the mask identifier module 254 to receive information related to the mask that encodes the data in the 2D symbol. The decoding unit 256 is thus operable to generate an unmasked codeword by applying at least a portion of the mask to the codeword or by applying the entire mask to the 2D symbol. The portion of the mask applied to the codeword corresponds with the location of the codeword in the 2D symbol. Note that since the codeword includes only a portion of the bits in the 2D symbol, to unmask the codeword, only the bits in the portion of the mask that corresponds with the location of the codeword in the 2D symbol is needed. However, decoding unit 256 can also unmask the codeword by applying the entire mask to the entire symbol.

To unmask the codeword, the decoding unit 256 applies the mask to the codeword by performing bitwise logical operations (e.g., logical AND, logical OR, logical NAND, exclusive-OR, etc.) between each codeword bit and each mask bit in the portion of the mask or between each bit in the symbol and each bit in the mask. In one embodiment, the logical operation is the exclusive-OR operation.

One embodiment of the apparatus 250 further includes the erasure identifier module 258. The erasure identifier module 258 can be any combination of hardware components and/or software agents able to detect, identify, and/or mark a codeword as an erasure or as having an erasure.

The erasure identifier module 258 is coupled to the decoding unit 256 and receives the unmasked codeword or unmasked 2D symbol from the decoding unit 256. The decoding unit 256 is further coupled to the mask identifier module 254 such that the decoding unit 256 is able to access the mask used for encoding the data in the 2D symbol or codeword for use in determining whether the codeword is an erasure.

In one embodiment, the erasure identifier module 258 compares the unmasked codeword with the portion of the mask that corresponds with the location of the codeword in the 2D symbol. For example, the erasure identifier module 258 performs the comparison by comparing each codeword bit value in the unmasked codeword with a corresponding mask bit value in the portion of the mask. If each codeword bit value matches each corresponding mask bit value, then the erasure identifier module 258 can identifying the codeword as the erasure. Similarly, if each codeword bit value matches the inverse of each corresponding mask bit value, then the erasure identifier module 258 can identifying the codeword as the erasure. The bitwise comparison mechanism for finding erasures is illustrated graphically with further reference to the example of FIG. 4E.

In addition, hexadecimal representations of the unmasked codeword and the mask can be used for identifying erasures. The erasure identifier module 258 can generate a hexadecimal representation of the unmasked codeword and a hexadecimal representation of the portion of the mask. Additionally, the erasure identifier module 258 can generate a hexadecimal representation of the entire 2D symbol and of the entire mask.

In making the comparison between the unmasked codeword and the portion of the mask, the erasure identifier module 258 compares the hexadecimal representation of the unmasked codeword with the hexadecimal representation of the portion the mask. The erasure identifier module 258 can identify and further save the codeword as the erasure in response to detecting a match in value of the hexadecimal representation of the unmasked codeword with the hexadecimal representation of the portion of the mask. Similarly, the hexadecimal values representing the entire 2D symbol can be compared with the hexadecimal values representing a mask. The hexadecimal values that match correspond to codewords that are erasures, as illustrated graphically in the example of FIG. 4D.

In one embodiment, the erasure identifier module 258 uses one or more reference matrices to determine whether the codeword is an erasure or has an erasure. The erasure identifier module 258 generates the reference matrix by applying the identified mask (e.g., scrambling mask) to a uniform matrix. A uniform matrix refers generally to matrices with same-valued bits such as a matrix with all '0' bit values or a matrix with all '1' bit values so that the erasure identifier module 258 can generate two reference matrices. Once a reference matrix has been generated, the erasure identifier module 258 compares the unscrambled codeword with the reference matrix to determine whether the codeword is the erasure.

For example, the erasure identifier module 258 determines whether each codeword bit value matches each corresponding reference bit value of a reference matrix. The erasure identifier module 258 can subsequently mark the codeword as an erasure if each codeword bit value matches each corresponding reference bit value of a reference matrix. In addition, the erasure identifier module 258 can subsequently mark the codeword as an erasure if each codeword bit value matches the inverse of each corresponding reference bit value of the same reference matrix.

One embodiment of the apparatus 250 further includes the error correction module 260. The error correction module 260 can be any combination of hardware components and/or software agents able to perform error correction on 2D symbols that have dirty or damaged portions.

The error correction module 260 is coupled to the erasure identifier module 258 to determine the locations of identified erasures. The error correction module 260 can then use one or more error correction functions including but not limited to the Reed-Solomon algorithm for error correction.

Codeword Unmasking and Reference Matrix Generation

FIG. 3 depicts diagrams illustrating 2D symbols obtained from applying an example of a mask 306 to a codeword 304 and uniform matrices 314 and 324.

In the example unmasking (unscrambling) process 302, a codeword 304 of a 2D symbol (e.g., 2D bar code, 1D barcode, 2D data, QR code, data matrix, and/or matrix of data, etc.) having four bits is unmasked (unscrambled) using the mask 306. The unmasked codeword 308 of process 302 is illustrated for a situation when a white pixel of bit value '0' in the mask corresponds with a 'reverse bit' operation and a black pixel of bit value '1' in the mask depicts a 'non-reverse bit' operation. In some situations, the reverse can be applied. For the purposes of illustration, a white pixel of bit value '0' depicts a 'reverse bit' and a black pixel of bit value '1' depicts a 'non-reverse bit'.

In the example process 312 of generating a first reference matrix 318 by applying the same mask 306 to a uniform matrix 314 comprised of white pixels. The reference bit values of the first reference matrix 318 obtained by applying the mask 306 to a uniform white matrix 314 has the inverse of the mask bit values of the mask 306 (e.g., the first reference matrix 318 has white pixels at the same locations where the mask 306 has black pixels and vice versa). In the example process 322, a second reference matrix 328 is generated by applying the same mask 306 to a uniform matrix 324 comprised of black pixels. The reference bit values of the second reference matrix 328 obtained from applying the mask 306 to a uniform black matrix 324 has the same values as the mask bit values of the mask 306 (e.g., reference matrix 328 has white pixels at the same locations where the mask 306 has white pixels and vice versa).

Thus, as illustrated, erasures can be identified when the unmasked 2D symbol (e.g., 2D bar code, QR code) is compared with reference matrices 318 and/or 328. By comparing the patterns or reference bit values of the reference matrices with the pattern or codeword bit values of an unmasked codeword, an erasure can be identified when the unmasked codeword has the same pattern (same bit values) or the inverse pattern (inverse bit values) as the reference matrices.

A reader can therefore "unmask" a 2D symbol by applying the mask used for encoding to the 2D symbol captured by the reader. This permits the reader to obtain a map of the unmasked codewords in the 2D symbol, and from that map of codewords, the reader can identify areas containing erasures. In general, a codeword can have any number of bits (e.g., 1, 2, 4, 8, 16, 32, etc.). Once the reader identifies erasures, the reader can employ standard error correction (e.g., Reed-Solomon) to compensate for those erasures (assuming the amount of erasures does not exceed the error correction capabilities of the symbol).

Erasure Identification

Figure 4A:
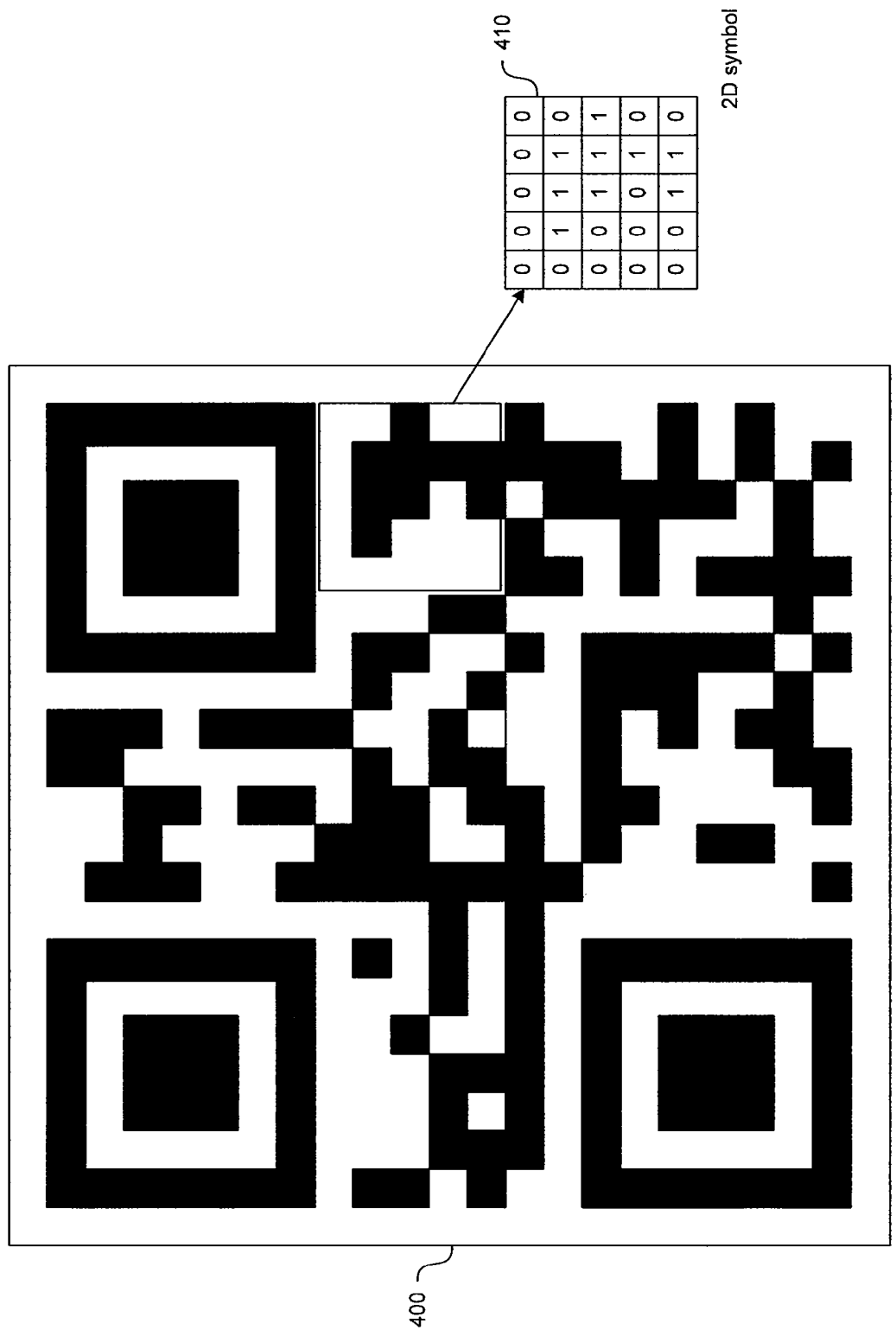
FIG. 4A depicts an example of a QR code and a 2D symbol representing a portion of the QR code.

FIG. 4A depicts an example of a QR code 400 and a 2D symbol 410 representing a portion of the QR code 400.

The QR code 400 illustrated is an example of a version 1 QR code with 21 modules on each side. Each module in a QR code can be represented by a bit value '0' or bit value '1' indicated by a white or black cell. The QR code can be retrieved from an image captured by a 2D symbol reader. An example of a matrix or group of bits is shown with a 5×5 matrix representing a portion of the QR code 410.

Figure 4B:
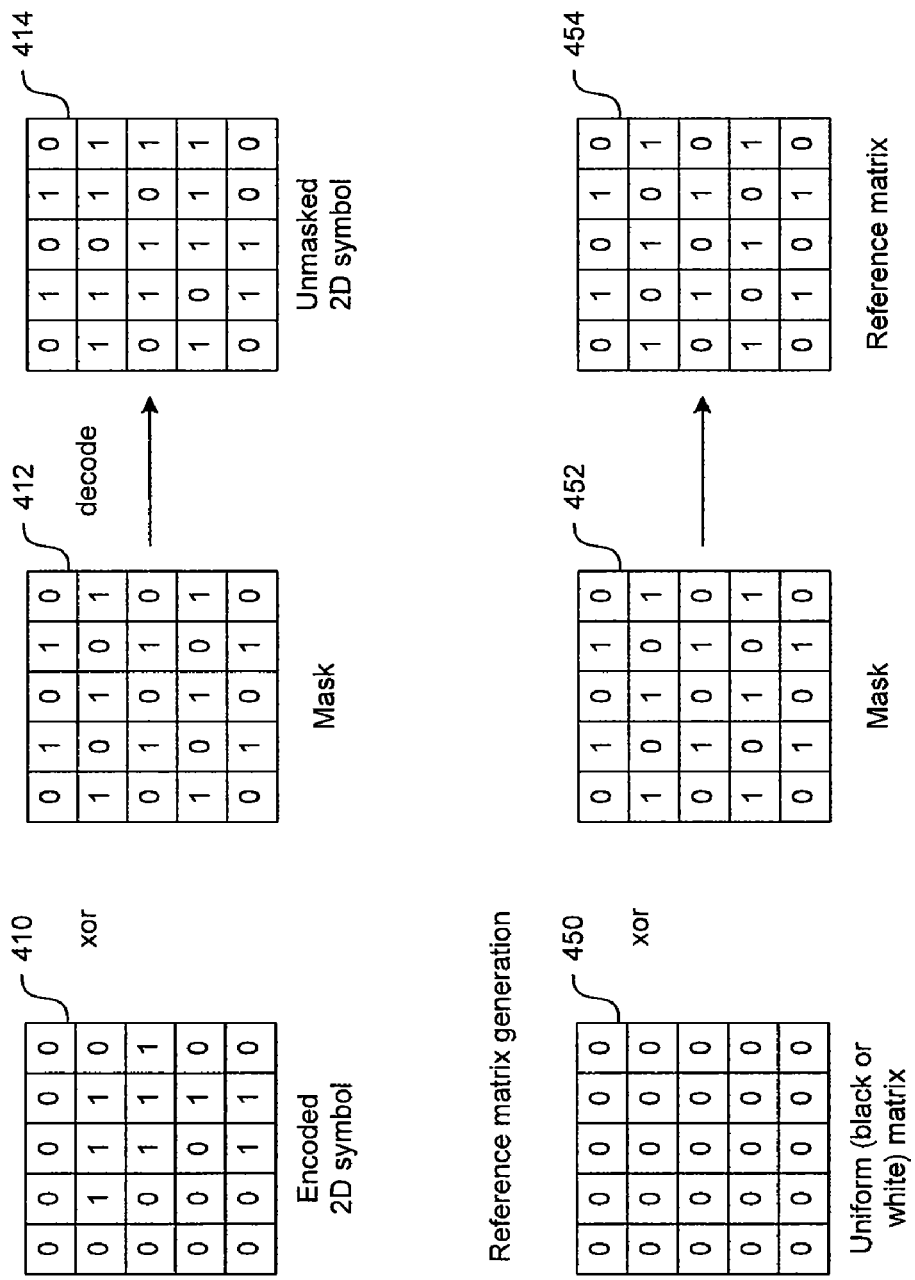
FIG. 4B depicts diagrams of unmasking the 2D symbol with a mask and generating a reference matrix generated by applying the same mask to a uniform matrix.

FIG. 4B depicts diagrams of unmasking the 2D symbol 410 with a mask 412 and generating a reference matrix 454 by applying the same mask 412 to a uniform matrix 450.

The mask 412 is mask 000 in QR coding represented by (i+j) mod 2=0, where indices 'i' and 'j' are position coordinates of each module. The 2D symbol 410 is the matrix that represents a portion of the QR code 400 in the example of FIG. 4A. By performing a logical operation (e.g., exclusive OR (XOR)) between the 2D symbol 410 and the mask 412, the unmasked (e.g., decoded, unscrambled) version of 2D symbol 410 can be generated (e.g., unmasked 2D symbol 414).

Similarly the reference matrix 454 can be generated by performing a logical operation (e.g., XOR) between the uniform matrix 450 (that may be black or white) and the mask 452. The mask 452 is also the mask 000 in QR coding represented by (i+j) mod 2=0. The reference matrix 454 is, in one embodiment used for comparison with the unmasked 2D symbol 414 to identify erasures in the 2D symbol 410.

Figure 4C:
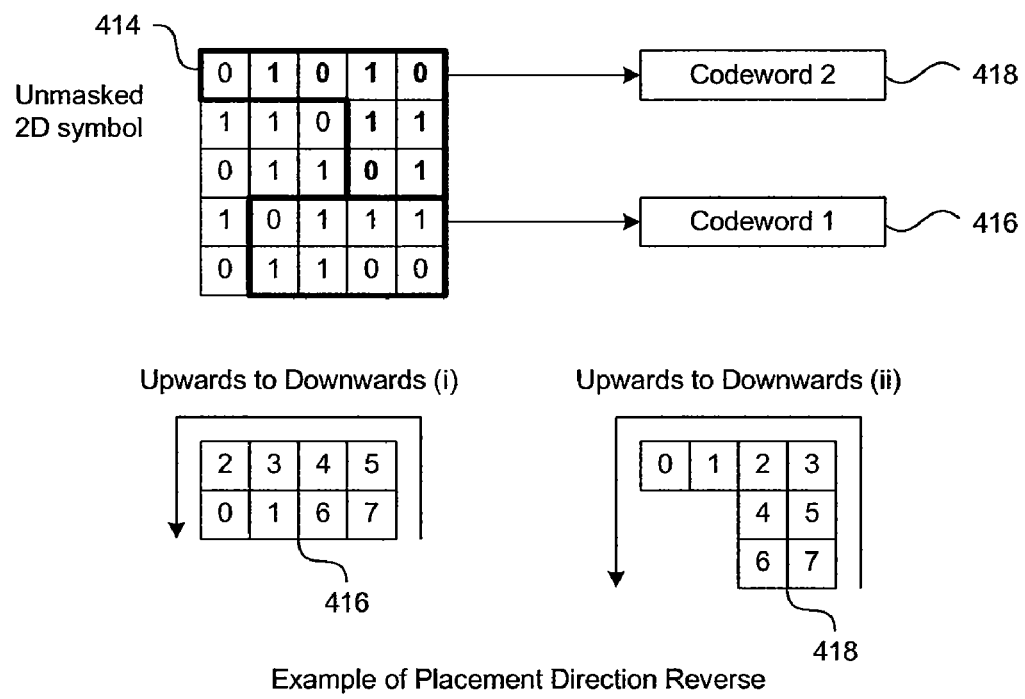
FIG. 4C depicts a diagram illustrating the locations of codeword 1 and codeword 2 in an unmasked 2D symbol.

FIG. 4C depicts a diagram illustrating the locations of codeword 1 416 and codeword 2 418 in an unmasked 2D symbol 414.

The bit values of codeword 1 416 and codeword 2 418 depend on the bit values in the unmasked 2D symbol 414. In QR coding, the codewords can be retrieved from the 2D symbol 414 based on the QR code specification. For example, the bits of codeword 1 416 can be retrieved from the 2D symbol 414 in the order illustrated as "7, 6, 5, . . . " in graph (i). The bits of codeword 2 418 can be retrieved from the data matrix in the order as illustrated as "7, 6, 5, . . . " in graph (ii). Although the codewords are illustrated in the example of FIG. 4C as having 8 bits, the codewords can have any number of bits (e.g., 1 bit, 2 bits, 4 bits, 8 bits, 16 bits, 32 bits, 64 bits, etc.) that is convenient or suitable for the application.

Hexadecimal Comparison

Figure 4D:
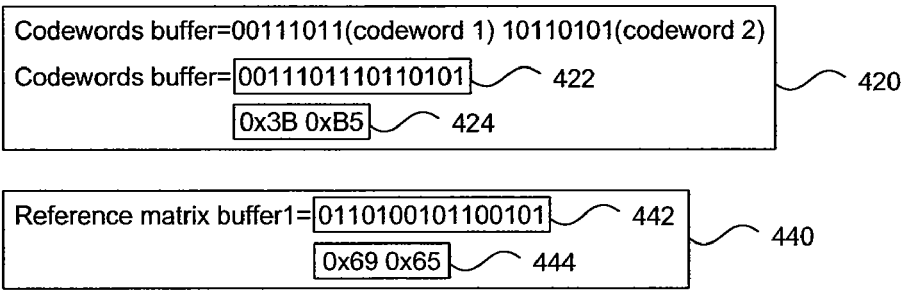
FIG. 4D depicts diagrams illustrating how to identify erasures using comparisons of hexadecimal representations of unmasked codewords and reference matrices.
Figure 4D:
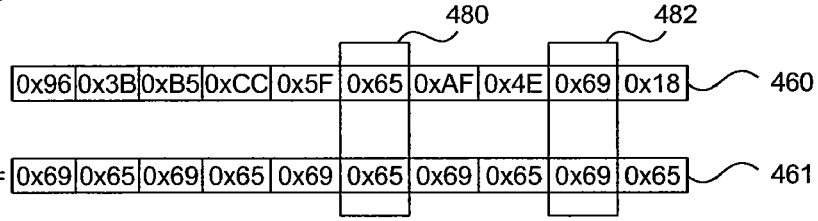
Figure 4D:
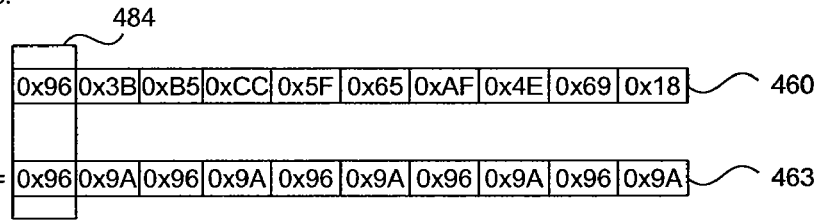

FIG. 4D depicts diagrams illustrating how comparisons using hexadecimal representations of codewords 460 and reference matrices 461 and 463 and are made to identify erasures.

Multiple codewords (e.g., codeword 1, codeword 2, etc.) can be retrieved from the unmasked 2D symbol 414 for comparison with codewords retrieved from the reference matrix (e.g., the reference matrix 452 of FIG. 4B). Box 420 illustrates the codewords stored in a codeword buffer in binary value 422 and in hex value 424. Box 440 illustrates the reference values stored in a reference matrix buffer in binary value 442 and in hex value 444.

For example, the codeword buffer 424 has hex value '0x3B 0xB5' and the reference buffer 444 has value '0x69 0x65'. Buffer values for the unmasked codewords and the reference matrix are compared to detect identical hex values (where such data is stored in one or more temporary buffers for the processing described herein). The codeword at the location of the masked 2D symbol (e.g., the symbol 410 in FIG. 4A) corresponding to the location in the unmasked 2D symbol 414 where a match in hex values occurs with the reference buffer can be marked as an erasure.

For example, the hex values in codeword buffer 460 is compared with hex values in the reference matrix buffer 1 461 and reference matrix buffer 2 463, respectively. Each reference matrix is generated from matrices with same-valued bits of value '1' or value '0'. When comparing the codeword buffer 460 with the reference buffer 1 461, codewords 480 ('0x65') and 482 ('0x69') have a match in hex value with the reference matrix buffer 461 and can be marked and saved as an erasure.

Similarly, when comparing the codeword buffer 460 with the reference buffer 2 463, codewords 484 ('0x96') have a match in hex value with the reference matrix buffer 463 and can be marked and saved as an erasure.

Bit-by-Bit Comparison

Figure 4E:
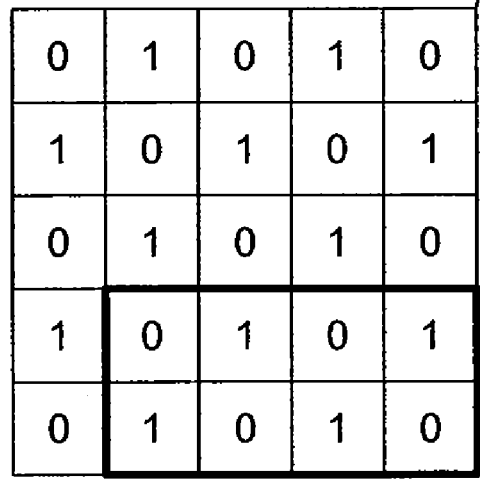
FIG. 4E depicts diagrams illustrating how to identify erasures using bit-wise comparisons of an unmasked 2D symbol and a reference matrix.
Figure 4E:
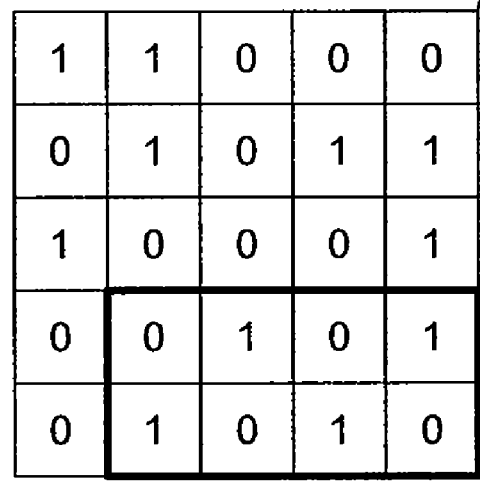

FIG. 4E depicts diagrams illustrating how bit-wise comparisons of an unmasked 2D symbol 494 and a reference matrix 454 is made to identify erasures in the unmasked 2D symbol.

The unmasked codeword 495 in the unmasked 2D symbol 494 is compared with the portion 455 of the reference matrix 454 that corresponds in location with the unmasked codeword 495 in the unmasked 2D symbol 494.

The unmasked codeword 495 include multiple codeword bits and the portion 455 of the reference matrix 454 includes reference bits. If each codeword bit value matches each corresponding reference bit value or the inverse of each corresponding reference bit value of the multiple reference bits, the codeword can be identified as an erasure. In this situation, each codeword bit value matches the reference bit value that corresponds in position in the overall matrices. Thus, the codeword 495 can be identified and saved as an erasure.

Process Flows for Using Bit-by-Bit and Hex-Value Comparison

Figure 5A:
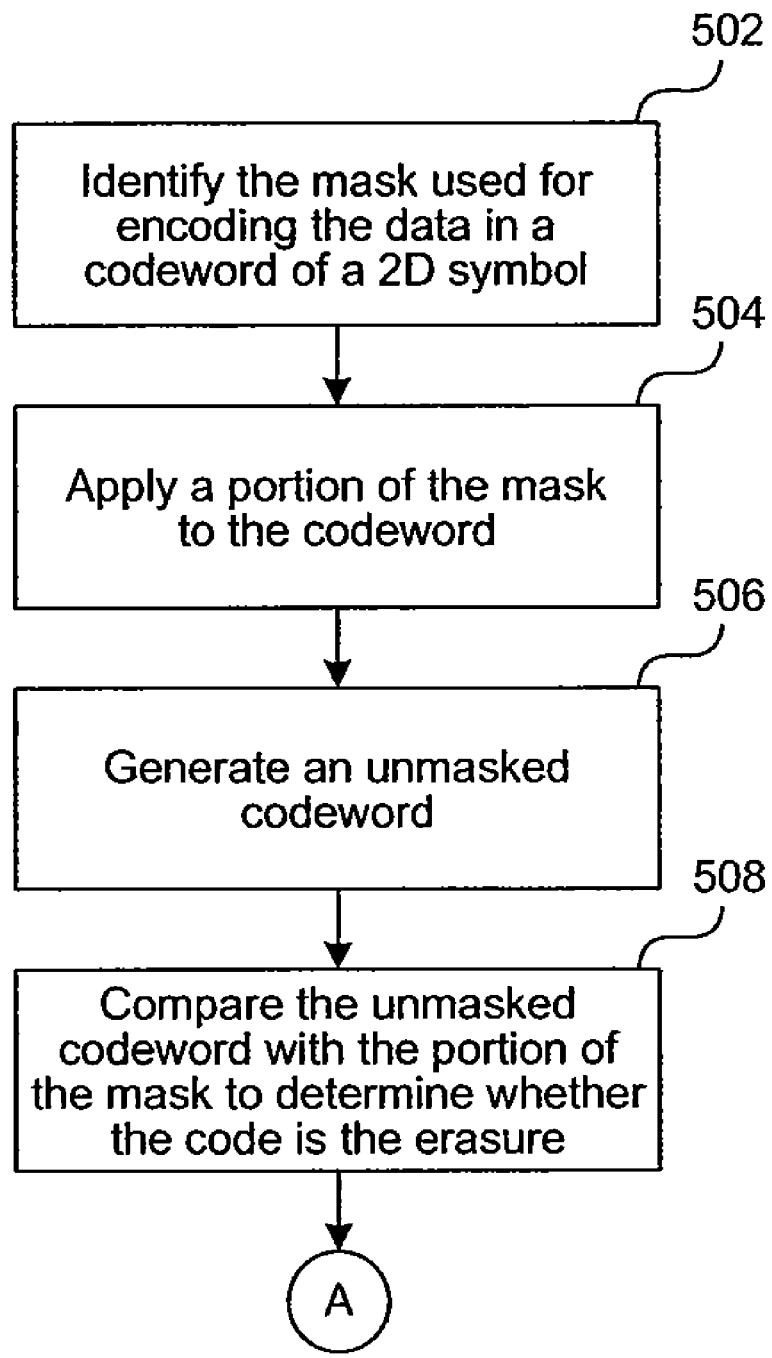
FIG. 5A-5B illustrates example process flows for using a reference matrix to mark a codeword in a 2D symbol as an erasure.
Figure 5B:
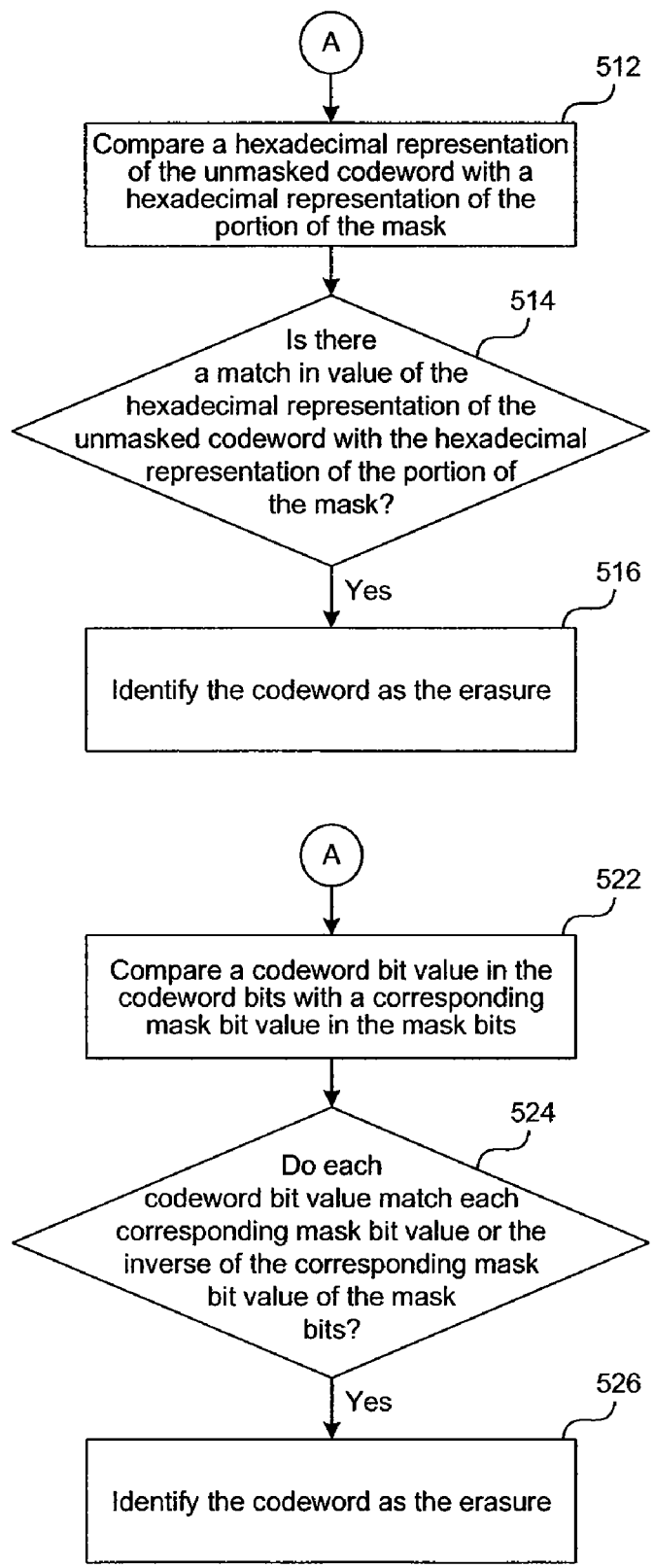

FIG. 5A-5B illustrates example process flows for identifying a codeword in a 2D symbol as an erasure.

An image of a 2D symbol (e.g., 2D bar code, 2D data, data matrix, QR code, 2D bar code, etc.) is obtained is initially captured and stored. The image can be obtained via any combination of software and/or hardware modules able to capture an image, including but not limited to, bar code scanners, scanners, laser detectors, photodiode-arrays, portable phones, camera phones, and/or cameras, etc. The obtained image can be locally stored for internal processing and/or sent to an external module/device for further operations/processing. The 2D symbol in the captured image typically includes data that is encoded with as mask, such as in QR encoding.

In process 502, the mask used for encoding the data in a codeword of a 2D symbol is identified. For example, in QR coding, the masked used to encode the 2D symbol can be retrieved from specific bit values containing format information of the particular QR code. In some instances, to ensure reliable QR code reading, the dark and light modules are arranged in a well-balanced manner in the symbol. Therefore, a suitable mask pattern among the eight masks illustrated in FIG. 7 is chosen by during encoding based on the distribution of light and dark modules in the original un-encoded data. Therefore, different 2D symbols may be encoded with different masks depending on the original data.

In some embodiments, the applied mask can be determined from retrieving the formatting information from certain bits in the 2D symbol. For example, in some instances, the formatting information is determined from the value (e.g. pattern) of the 2D symbol at a predetermined location. The formatting information is identified prior to or after obtaining the pixel image. Once the formatting information is determined from the information bits in a QR code, for example, the symbol mask, size and/or error level information can be identified.

In process 504, an unmasked codeword is generated by applying a portion the mask to the codeword in the 2D symbol. The portion of the portion of the mask corresponds with a location of the codeword in the 2D symbol. Note that the codeword includes multiple codeword bits and the mask includes multiple mask bits. In unmasking the codeword, a logical exclusive-OR operation is performed between each of the codeword bits and each of the mask bits in the portion of the mask. In process 506, an unmasked codeword is generated.

In process 508, the unmasked codeword is compared with the portion of the mask to determine whether the codeword is the erasure. The comparison process and be performed bit-by-bit or using hex values and are described with further reference to the example flow charts of FIG. 5B.

In process 512, a hexadecimal representation of the unmasked codeword is compared with a hexadecimal representation of the portion the mask. In process 514, it is determined whether there is a match in value of the hexadecimal representation of the unmasked codeword with the hexadecimal representation of the portion of the mask. If so, in process 516, the codeword is identified as an erasure or as having an erasure.

In addition, multiple hexadecimal representations of the unmasked 2D symbol can be compared with the multiple hexadecimal representations of the entire mask to detect matches in values to identify codewords as erasures when the hex value matches that of the corresponding portion of the mask.

In process 522, a codeword bit value in the codeword bits is compared with a corresponding mask bit value in the mask bits. This process is repeated until each codeword bit value in the codeword bits is compared with each corresponding mask bit value in the mask bits to detect either a match in bit values or a match with the inverse bit value. In process 524, it is determined whether each codeword bit value matches each corresponding mask bit value or the inverse of the corresponding mask bit value of the mask bits. If so, in process 526, the codeword is identified as an erasure or as having an erasure.

Process Flow for Using Reference Matrices

Figure 5C:
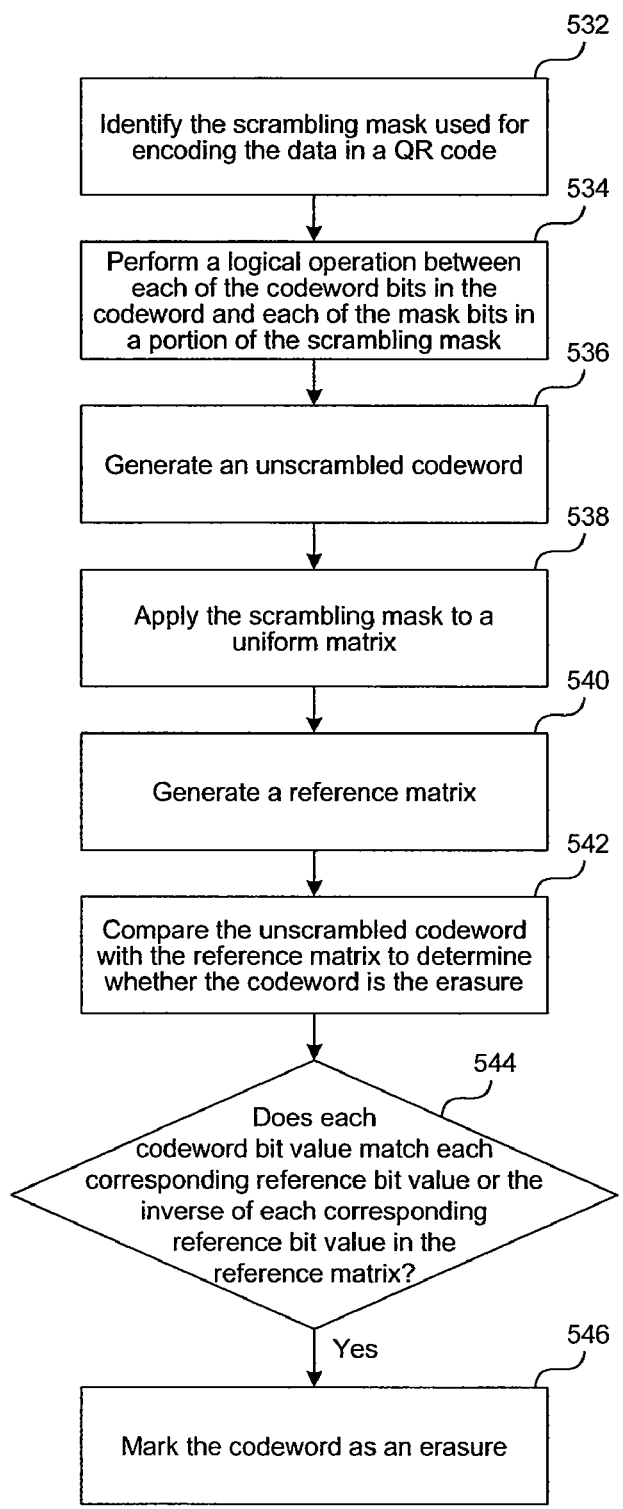
FIG. 5C illustrates an example process flow for marking a codeword as an erasure in a QR code using a reference matrix.

FIG. 5C illustrates an example process flow for marking a codeword as an erasure in a QR code using a reference matrix.

In process 532, the scrambling mask used for encoding the data in a QR code is identified. The scrambling masks that can be used for QR encoding is illustrated with further reference to FIG. 7. Note that the location of the codeword in the QR code corresponds with a portion of the scrambling mask. This portion of the scrambling mask can be used to unscramble the codeword in question. Alternatively, the entire scrambling mask can be used to unscramble the entire QR code to obtain the unscrambled codeword.

In process 534, a logical operation between each of the codeword bits in the codeword and each of the mask bits in a portion of the scrambling mask is performed to generate an unscrambled codeword, in process 536. In one embodiment, the logical operation is a logical exclusive-OR operation.

In process 538, the scrambling mask is applied to a uniform matrix to generate a reference matrix, in process 540. A uniform matrix generally includes a set of same-valued bits. For example, the uniform matrix may include all valued '1' bits (black matrix) or all valued '0' bits (white matrix). Thus, two different reference matrices having multiple reference bits can be generated by performing the logical operation (e.g., XOR) between the set of same-valued bits (all '1' or all '0') and the multiple mask bits in the portion of the scrambling mask.

In process 542, the unscrambled codeword is compared with the reference matrix to determine whether the codeword is the erasure. The unscrambled codeword can be compared with either of or both of the two reference matrices generated from an all '1' matrix and an all '0' matrix. For example, the unscrambled codeword can be compared with reference bits in both reference matrices to detect matches. When only one reference matrix is used for comparison, the unscrambled codeword is compared with the reference bits and the inverse reference bits to detect a match and to identify all the erasures.

In process 544, it is determined whether each codeword bit value matches each corresponding reference bit value or the inverse of each corresponding reference bit value in the reference matrix. Alternatively, it is determined whether each codeword bit value matches each reference bit value in both reference matrices. If so, in process 546, the codeword is identified as an erasure or as having an erasure. Processes 532-546 can be repeated to identify erasures in multiple codewords in a QR code. In one embodiment, a Reed-Solomon correction algorithm is used to correct the errors/erasures.

Figure 6:
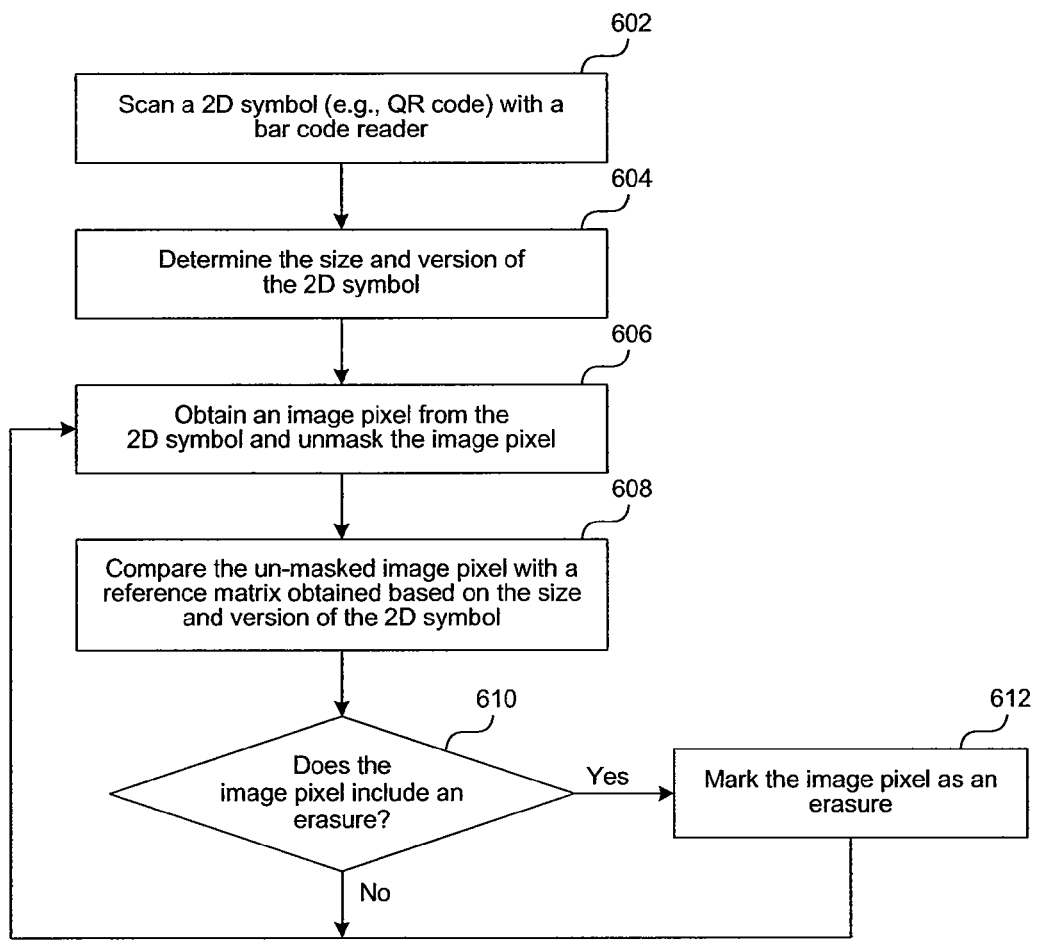
FIG. 6 illustrates a process flow for scanning a 2D symbol and using a reference matrix to detect an erasure in the 2D symbol.

FIG. 6 illustrates a process flow for scanning a 2D symbol and detecting an erasure in the 2D symbol using a reference matrix.

In process 602, a 2D symbol (e.g., QR code) is scanned with a bar code reader. In process 604, the size and version of the 2D symbol is determined. The size and version of the 2D symbol can be determined from the captured image. Specifically, in a QR code image, the version information can be identified in a localized area on the image. The localized area is generally determined by a predetermined algorithm.

In general, for QR Codes, the symbols size can be determined from the symbol size via the following relationship: size=17+version*4. In some embodiments, the size and version are determined from a predetermined setting (e.g., user specified). In addition, the bar code reader may be able to automatically compute and/or measure the size of the 2D symbol. The version of the 2D symbol can, in some embodiments, be determined from the formatting information bits of the 2D symbol. The image may be locally stored and/or sent to and externally coupled device for additional processing/storing including, but not limited to, size and version detection.

In process 506, a pixel image is obtained from the 2D symbol based on the identified size and version for additional processing (e.g., error detection). In QR codes, symbol sizes are characterized by the number of modules in each dimension and currently, the symbol versions range from Version 1 to Version 40. Each version has a different module configuration or number of modules. In process 608, the pixel image is compared with at least one reference matrix obtained based on the determined size and version of the 2D symbol. The reference matrix can be generated based on, for example, the process described for applying a mask to a uniform matrix with further reference to FIG. 5C. Similarly, the unmasked pixel image comparison process with the reference matrix can be performed in a manner similar to that described with reference to FIG. 5C.

Based on the comparison, in process 610, it is determined if the pixel image includes an erasure. If so, in process 612, the pixel image is marked as an erasure for subsequent processing such as error correction procedures.

FIG. 7 depicts the mask patterns for encoding data to generate a QR code.

In QR encoding, data is scrambled by applying a mask for encoding data. The masking patterns currently being used are illustrated as masks 0-7 in FIG. 7. Each bit in a data matrix is masked in a fashion dependent on the mask level used. For example, each bit (e.g., module) is masked based on its position in the data matrix (e.g., identified by i and j coordinates) and the conditions specific to each mask level. When the condition yields a bit '0' for a particular location, for example, the bit value can be reversed. Similarly, when the condition yields a bit '1' for another location, the bit value can be maintained. In other embodiments, the reverse is applied.

Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the invention is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C Section 112, sixth paragraph, other aspects may likewise be embodied as a means-plus-function claim, or in other forms, such as being embodied in a computer-readable medium. (Any claims intended to be treated under 35 U.S.C. §112, ¶6 will begin with the words "means for".) Accordingly, the inventors reserve the right to add additional claims after filing the application to pursue such additional claim forms for other aspects of the disclosure.

We claim:

1. A method for identifying a codeword in a two-dimensional symbol as an erasure, the two-dimensional symbol having data that is encoded with a mask, the method, comprising:
    comparing an unmasked codeword in the two-dimensional symbol with a portion of the mask,
    the mask being used for encoding data in the two-dimensional symbol,
    wherein the unmasked codeword is generated by applying the portion of the mask to the codeword, and
    wherein the portion of the mask corresponds with a location of the codeword in the two-dimensional symbol; and
    determining whether the codeword is an erasure based on the comparison of the unmasked codeword with the portion of the mask, by comparing a codeword bit value of multiple codeword bits in the unmasked codeword with a corresponding mask bit value of multiple mask bits of the portion of the mask.

2. The method of claim 1,
    wherein, the codeword comprises multiple codeword bits and the portion of the mask comprises multiple mask bits; and
    wherein, the generating the unmasked codeword comprises performing a logical exclusive-OR operation between each of multiple codeword bits and multiple mask bits.

3. The method of claim 1, further comprising:
    determining whether each codeword bit value of multiple codeword bits matches each corresponding mask bit value of multiple mask bits; and
    identifying the codeword as the erasure in response to determining each codeword bit value matches each corresponding mask bit value.

4. The method of claim 1, further comprising:
    determining whether each codeword bit value of multiple codeword bits matches an inverse of each corresponding mask bit value of multiple mask bits; and
    identifying the codeword as the erasure in response to determining each codeword bit value matches the inverse of each corresponding mask bit value.

5. The method of claim 1, further comprising:
    generating a reference matrix by applying the mask to a uniform matrix;
    wherein, the uniform matrix comprises a set of same-valued bits and the reference matrix comprises multiple reference bits.

6. The method of claim 5, further comprising, comparing the unmasked codeword with the reference matrix to determine whether the codeword is the erasure.

7. The method of claim 6, further comprising:
    determining whether each codeword bit value of multiple bits of the unmasked codeword matches each corresponding reference bit value or the inverse of each corresponding reference bit value of multiple reference bits of the reference matrix; and identifying the codeword as the erasure if each codeword bit value of multiple bits of the unmasked codeword matches each corresponding reference bit value or the inverse of each corresponding reference bit value of multiple reference bits of the reference matrix.

8. The method of claim 6, further comprising, performing error correction on the codeword identified as the erasure.

9. The method of claim 1, wherein, the two-dimensional symbol is a QR code or a data matrix.

10. The method of claim 1, wherein, the two-dimensional symbol is a two-dimensional bar code.

11. An apparatus for identifying a codeword as an erasure in a two-dimensional (2D) symbol, the 2D symbol having data that is encoded with a mask, the apparatus, comprising:
   a mask identifier module operable to identify the mask used for encoding the data in the codeword;
   a decoding unit coupled to the mask identifier module, the decoding unit operable to generate an unmasked codeword by applying a portion of the mask to the codeword;
   wherein, the portion of the mask corresponds with a location of the codeword in the 2D symbol;
   wherein, the codeword comprises multiple codeword bits and the portion of the mask comprises multiple mask bits;
   an erasure identifier module coupled to the decoding unit, the erasure identifier module operable to:
   compare the unmasked codeword with the portion of the mask to determine whether the codeword is the erasure;
   compare a codeword bit value of multiple bits in the unmasked codeword with a corresponding mask bit value of multiple mask bits of the portion of the mask;
   determining whether each codeword bit value of multiple bits matches each corresponding mask bit value or an inverse of each corresponding mask bit value of multiple mask bits; and
   identifying the codeword as the erasure in response to determining each codeword bit value matches each corresponding mask bit value or the inverse of each corresponding mask bit value.

12. The apparatus of claim 11, further comprising, an image capture unit for capturing the 2D symbol.

13. A non-transitory computer-readable medium storing instructions, which when executed by a data processing device, perform a method for identifying a codeword in a two-dimensional symbol as an erasure, wherein the two-dimensional symbol has data encoded with a mask, the method comprising:
   comparing an unmasked codeword in the two-dimensional symbol a portion of the mask,
   wherein the mask is used for encoding data in the two-dimensional symbol,
   wherein the unmasked codeword is generated by applying the portion of the mask to the codeword,
   wherein the portion of the mask corresponds with a location of the codeword in the two-dimensional symbol; and,
   determining whether the codeword is an erasure based on the comparison of the unmasked codeword with the portion of the mask, by comparing a codeword bit value of multiple codeword bits in the unmasked codeword with a corresponding mask bit value of multiple mask bits of the portion of the mask.

14. The computer-readable medium of claim 13,
   wherein, the codeword comprises multiple codeword bits and the portion of the mask comprises multiple mask bits; and
   wherein, the generating the unmasked codeword comprises performing a logical exclusive-OR operation between each of multiple codeword bits and multiple mask bits.

15. The computer-readable medium of claim 13, further comprising:
   generating a reference matrix by applying the mask to a uniform matrix;
   wherein, the uniform matrix comprises a set of same-valued bits and the reference matrix comprises multiple reference bits.

16. The computer-readable medium of claim 13, wherein, the two-dimensional symbol is a QR code or a data matrix.

17. The computer-readable medium of claim 13, wherein, the two-dimensional symbol is a two-dimensional bar code.

* * * * *